US009826390B2

(12) United States Patent
Stojanovski et al.

(10) Patent No.: US 9,826,390 B2
(45) Date of Patent: Nov. 21, 2017

(54) MANAGEMENT TECHNIQUES FOR WIRELESS NETWORK MOBILITY PROCEDURES

(71) Applicant: INTEL IP CORPORATION, Santa Clara, CA (US)

(72) Inventors: Alexandre S. Stojanovski, Paris (FR); Sasha Sirotkin, Petach Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/411,498

(22) PCT Filed: Mar. 27, 2014

(86) PCT No.: PCT/US2014/032057
§ 371 (c)(1),
(2) Date: Dec. 27, 2014

(87) PCT Pub. No.: WO2014/160885
PCT Pub. Date: Oct. 2, 2014

(65) Prior Publication Data
US 2015/0146532 A1 May 28, 2015

Related U.S. Application Data

(60) Provisional application No. 61/806,821, filed on Mar. 29, 2013.

(51) Int. Cl.
*H04W 36/34* (2009.01)
*H04W 8/08* (2009.01)
(Continued)

(52) U.S. Cl.
CPC .............. *H04W 8/082* (2013.01); *H04B 1/56* (2013.01); *H04B 7/0417* (2013.01);
(Continued)

(58) Field of Classification Search
None
See application file for complete search history.

(56) References Cited

U.S. PATENT DOCUMENTS 6,058,311 A * 5/2000 Tsukagoshi ............. H04W 8/26
455/433
8,681,740 B2 3/2014 Bovo et al.
(Continued)

FOREIGN PATENT DOCUMENTS

WO 2011096781 A2 8/2011
WO 2013019263 A1 2/2013

OTHER PUBLICATIONS

International Search Report and Written Opinion, Mailed Date: Aug. 14, 2014, Application No. PCT/US2014/032057, Filed Date: Mar. 27, 2014, pp. 21.

(Continued)

Primary Examiner — Chi H Pham
Assistant Examiner — Shick Hom

(57) ABSTRACT

Connection management techniques for wireless network mobility procedures are described. In one embodiment, for example, an evolved packet core (EPC) node may comprise a processor circuit to receive a notification of a mobility procedure for a user equipment (UE), determine whether to release a local gateway (L-GW)-provided packet data network (PDN) connection of the UE, and in response to a determination that the L-GW-provided PDN connection is to be released, send either a detach request message or a delete session request message to initiate a process for releasing the L-GW-provided PDN connection. Other embodiments are described and claimed.

22 Claims, 11 Drawing Sheets

(51) Int. Cl.

| | | |
|---|---|---|
| *H04L 5/00* | (2006.01) | |
| *H04B 1/56* | (2006.01) | |
| *H04B 7/06* | (2006.01) | |
| *H04W 48/16* | (2009.01) | |
| *H04W 36/30* | (2009.01) | |
| *H04W 24/00* | (2009.01) | |
| *H04W 36/26* | (2009.01) | |
| *H04W 48/18* | (2009.01) | |
| *H04B 7/0417* | (2017.01) | |
| *H04W 36/00* | (2009.01) | |
| *H04W 36/22* | (2009.01) | |
| *H04L 1/18* | (2006.01) | |
| *H04W 24/02* | (2009.01) | |
| *H04W 72/04* | (2009.01) | |
| *H04W 72/08* | (2009.01) | |
| *H04W 28/20* | (2009.01) | |
| *H04L 29/06* | (2006.01) | |
| *H04M 1/725* | (2006.01) | |
| *H04W 4/02* | (2009.01) | |
| *H04W 8/02* | (2009.01) | |
| *H04W 8/06* | (2009.01) | |
| *H04W 28/02* | (2009.01) | |
| *H04W 76/02* | (2009.01) | |
| *H04W 48/06* | (2009.01) | |
| *H04L 25/03* | (2006.01) | |
| *H04N 21/24* | (2011.01) | |
| *H04N 21/845* | (2011.01) | |
| *H04N 21/8543* | (2011.01) | |
| *H04B 7/0452* | (2017.01) | |
| *H04B 7/08* | (2006.01) | |
| *H04L 25/02* | (2006.01) | |
| *H04W 36/08* | (2009.01) | |
| *H04W 48/12* | (2009.01) | |
| *H04W 88/08* | (2009.01) | |
| *H04W 84/04* | (2009.01) | |
| *H04W 88/10* | (2009.01) | |
| *H04W 84/12* | (2009.01) | |
| *H04W 88/02* | (2009.01) | |
| *H04W 28/08* | (2009.01) | |

(52) U.S. Cl.
CPC ............ *H04B 7/0452* (2013.01); *H04B 7/063* (2013.01); *H04B 7/0619* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 25/0206* (2013.01); *H04L 25/03305* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72572* (2013.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/0226* (2013.01); *H04W 28/0289* (2013.01); *H04W 28/20* (2013.01); *H04W 36/0005* (2013.01); *H04W 36/0011* (2013.01); *H04W 36/0022* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 72/0446* (2013.01); *H04W 72/082* (2013.01); *H04W 76/025* (2013.01); *H04L 5/0007* (2013.01); *H04L 2025/03426* (2013.01); *H04W 28/085* (2013.01); *H04W 36/08* (2013.01); *H04W 48/12* (2013.01); *H04W 72/046* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(56) References Cited

U.S. PATENT DOCUMENTS

| | | | |
|---|---|---|---|
| 9,247,471 B2 | 1/2016 | Velev et al. | |
| 9,398,517 B2 | 7/2016 | Faccin et al. | |
| 2008/0259848 A1* | 10/2008 | Aso | H04L 29/12311 370/328 |
| 2010/0054208 A1* | 3/2010 | Kojima | 370/331 |
| 2011/0274087 A1 | 11/2011 | Laing et al. | |
| 2012/0023360 A1 | 1/2012 | Cheng et al. | |
| 2012/0076121 A1 | 3/2012 | Choi et al. | |
| 2012/0189016 A1 | 7/2012 | Bakker et al. | |
| 2012/0218974 A1* | 8/2012 | Zhou et al. | 370/331 |
| 2012/0257598 A1 | 10/2012 | Karampatsis et al. | |
| 2013/0003697 A1 | 1/2013 | Adjakple et al. | |
| 2013/0308527 A1* | 11/2013 | Chin et al. | 370/328 |

OTHER PUBLICATIONS

Office Action received for Taiwanese Patent Application No. 103111743, mailed May 25, 2015, 20 pages including 8 pages English translation.

3artial Supplementary European Search Report received for European Patent Application No. 14773598.9, dated Sep. 7, 2016, 7 pages.

"LIPA handover problem", 3GPP TSG SA WG2, Meeting #81, TD S2-104904, Nokia Siemens Networks, Oct. 11-15, 2010, 4 pages.

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.0.0 (Mar. 2013), 70 pages (author unknown).

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.0.0 (Mar. 2013), 72 pages (author unknown).

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.0.0 (Mar. 2013), 74 pages (author unknown).

Office Action received for Japanese Patent Application No. 2016-505572, dated Sep. 13, 2016, 11 pages including 6 pages English translation.

Office Action received for Korean Patent Application No. 2015-7023318, dated Sep. 27, 2016, 9 pages including 5 pages English translation.

Office Action received for Taiwanese Patent Application No. 104132545, dated Oct. 4, 2016, 14 pages including 6 pages English translation.

"3GPP TR 23.859 V12.0.0; Technical Specification Group Services and System Aspects; Local IP access (LIPA) obility and Selected IP Traffic Overload (SIPTO) at the local network (Release 12)", (unavailable).

Extended European Search Report received for European Patent Application No. 14773598.9, dated Dec. 9, 2016, 20 pages.

Catt, "PDN deactivation with reactivation for SIPTO at the local network", 3GPP Draft; SA WG2 Meeting #95, 32-130251, XP050684801, Jan. 28-Feb. 1, 2013, 5 pages.

(56) References Cited

OTHER PUBLICATIONS

Research in Motion UK Limited, "TAU while back-off timer is running if UE has performed LAU in GERAN or UTRAN for CS services", 3GPP Draft, SA WG2 Meeting #91, S2-122240, XP050632748, May 15, 2012, 15 pages.
Huawei et al., "Support of SIPTO at the Local Network", 3GPP Draft, SA WG2 Meeting #95, S2-130690, XP050685199, Feb. 1, 2013, 22 pages.
Huawei et al., "Mobility consideration for SIPTO@LN", 3GPP TSG SA WG2 Meeting #95, S2-130124, XP050684686, Feb. 1, 2013, 3 pages.
Huawei et al., "LIPA PDN connection deactivation", 3GPP TSG SA WG2 Meeting #82, S2-105610, XP050468006, Nov. 15-19, 2010, 15 pages.

* cited by examiner

*FIG. 9*

Storage Medium 900

Computer Executable Instructions for 600

Computer Executable Instructions for 700

Computer Executable Instructions for 800

MANAGEMENT TECHNIQUES FOR WIRELESS NETWORK MOBILITY PROCEDURES

RELATED CASE

This application claims priority to U.S. Provisional Patent Application No. 61/806,821, filed Mar. 29, 2013, the entirety of which is hereby incorporated by reference.

TECHNICAL FIELD

Embodiments herein generally relate to communications between devices in broadband wireless communications networks.

BACKGROUND

In a wireless network such as an Evolved Universal Terrestrial Radio Access Network (E-UTRAN), a home evolved node B (HeNB) may be deployed to implement a femtocell that provides wireless network access within a relatively small area such as an office or residence. In various implementations, a local gateway (L-GW) may be deployed along with the HeNB in order to improve packet data network (PDN) access within the general area served by the HeNB. In some cases, the L-GW may be collocated with the HeNB. Hereinafter, such an L-GW shall be referred to as a "collocated L-GW". In other cases, the L-GW may be collocated with a serving gateway (S-GW) at a stand-alone gateway (GW). Hereinafter, such an L-GW shall be referred to as a "stand-alone L-GW."

A user equipment (UE) that is served by an HeNB may make use of an L-GW to more directly communicate with a PDN such as the Internet. More particularly, the UE may use a Selected Internet Protocol (IP) Traffic Offload at the Local Network (SIPTO@LN) PDN connection to communicate with the PDN via the L-GW rather than through a core packet network. When a mobility event occurs according to which the UE moves away from the coverage area of the L-GW, it may be necessary and/or desirable that the SIPTO@LN PDN connection be released. However, conventional connection management techniques may not define appropriate or optimal procedures for releasing some SIPTO@LN PDN connections.

BRIEF DESCRIPTION OF THE DRAWINGS

FIG. 9 illustrates an embodiment of a storage medium.

DETAILED DESCRIPTION

Figure 1:
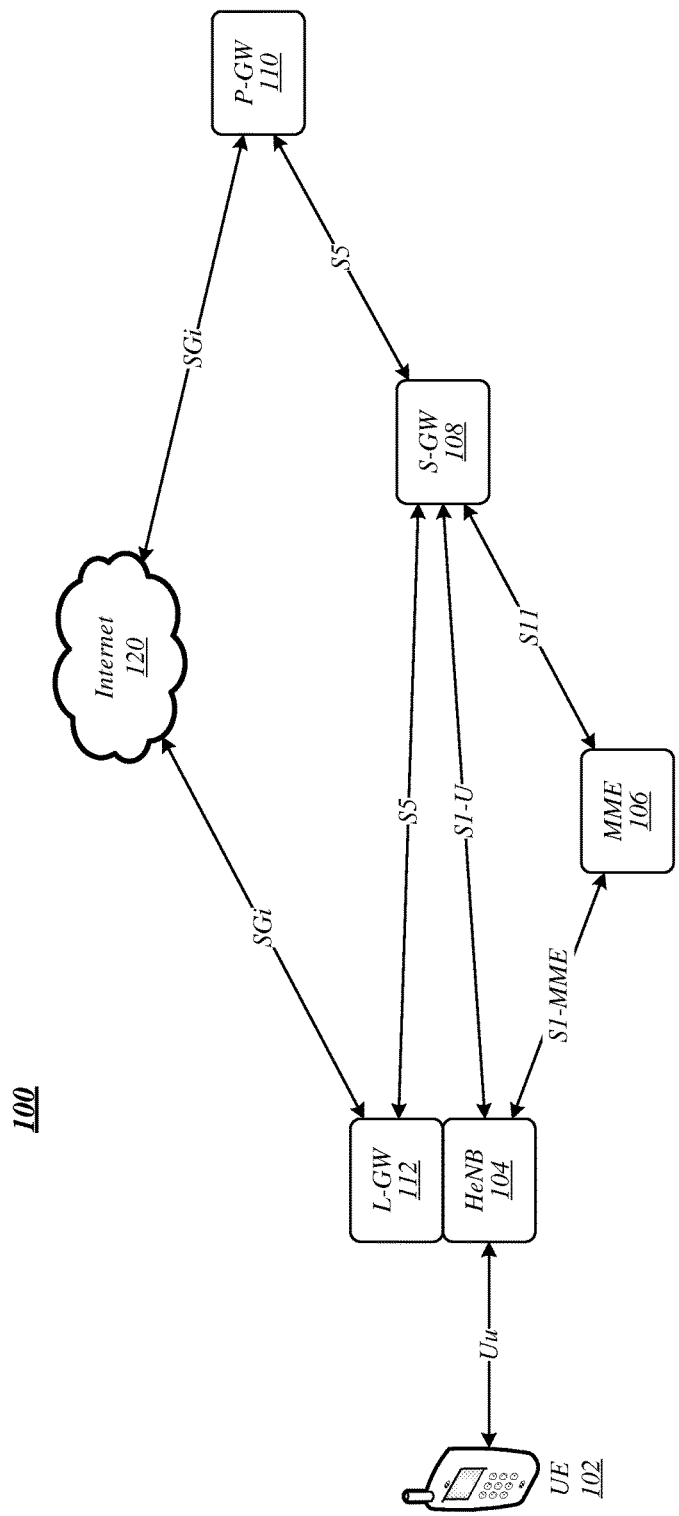
FIG. 1 illustrates an embodiment of a first operating environment.

Various embodiments may be generally directed to connection management techniques for wireless network mobility procedures. In one embodiment, for example, an evolved packet core (EPC) node may comprise a processor circuit to receive a notification of a mobility procedure for a user equipment (UE), determine whether to release a local gateway (L-GW)-provided packet data network (PDN) connection of the UE, and in response to a determination that the L-GW-provided PDN connection is to be released, send either a detach request message or a delete session request message to initiate a process for releasing the L-GW-provided PDN connection. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants.

Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants. Examples of wireless mobile broadband technologies may also include without limitation any of the Institute of Electrical and Electronics Engineers (IEEE) 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants. The embodiments are not limited in this context.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 such as may be representative of various embodiments. More particularly, operating environment 100 may be representative of some embodiments in which a UE may establish a SIPTO@LN PDN connection through a collocated L-GW. As shown in FIG. 1, a UE 102 communicates with an HeNB 104 over a Uu interface connection. The HeNB 104 communicates with a mobility management entity (MME) 106 over an S1-MME interface connection, and communicates with a serving gateway (S-GW) 108 over an S1-U interface connection. MME 106 communicates with S-GW 108 over an S11 interface connection. S-GW 108 communicates with a PDN gateway (P-GW) 110 over an S5 interface connection. P-GW 110 connects to the Internet 120 via an SGi interface connection. Collocated with HeNB 104 is an L-GW 112, which also connects to the Internet 120 over an SGi interface connection. Rather than communicating with the Internet 120 through P-GW 110, UE 102 may establish a SIPTO@LN PDN connection to the Internet 120 through L-GW 112. Using the SIPTO@LN PDN connection to communicate with the Internet 120 may Using the SIPTO@LN PDN connection to communicate with the Internet 120 may enable UE 302 to avoid latency associated with usage of the core packet network.

Figure 2:
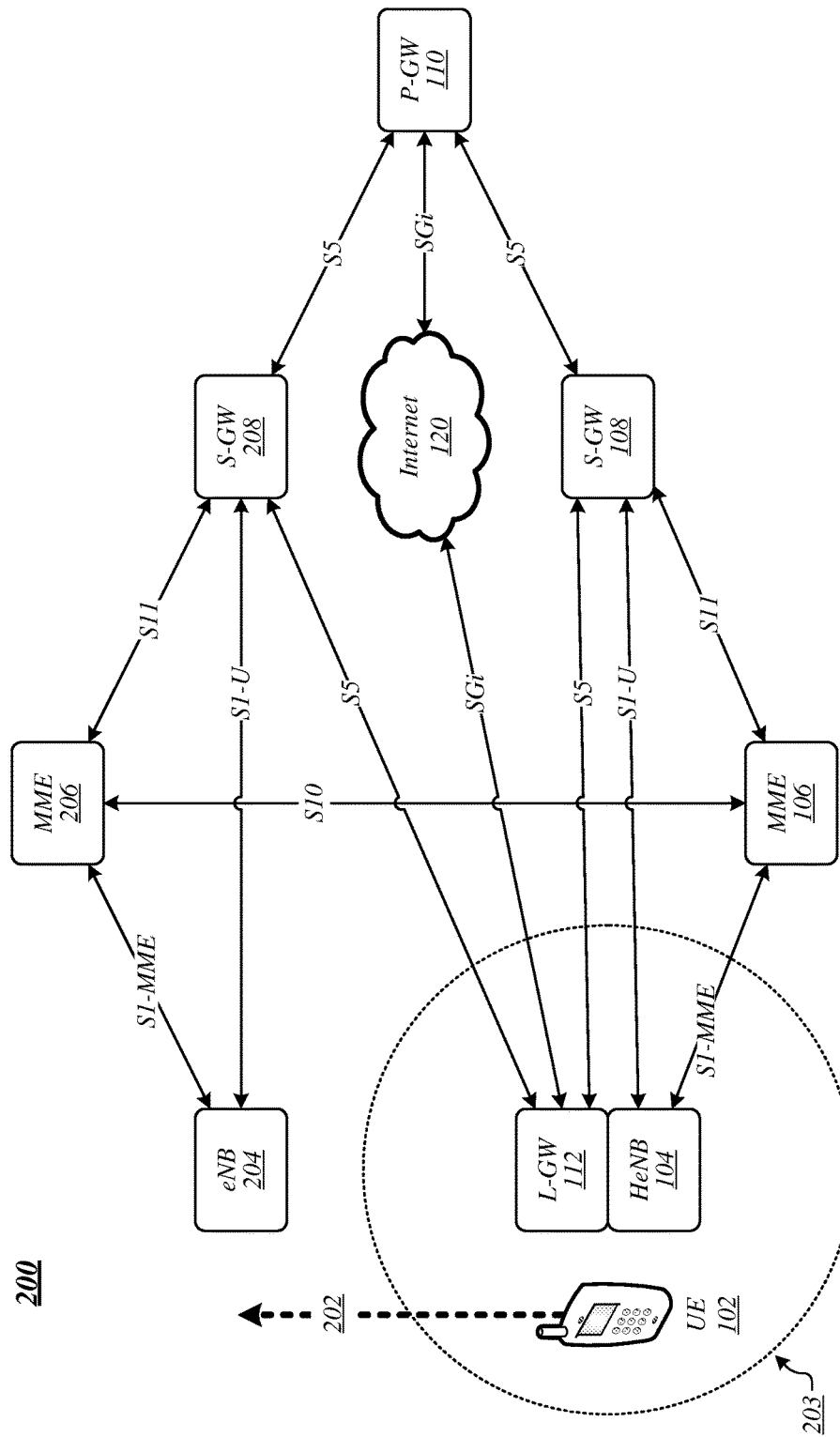
FIG. 2 illustrates an embodiment of a second operating environment.

FIG. 2 illustrates an operating environment 200 such as may be representative of various embodiments. More particularly, operating environment 200 may be representative of some embodiments in which UE 102 of FIG. 1 moves away from HeNB 104. As shown in FIG. 2, a mobility event 202 occurs according to which UE 102 moves away from HeNB 104, and towards an eNB 204. In the course of mobility event 202, UE 102 exits a coverage area 203 for HeNB 104. eNB 204 communicates with an MME 206 over an S1-MME interface connection, and communicates with an S-GW 208 over an S1-U interface connection. MME 206 communicates with S-GW 208 over an S11 interface connection, and S-GW 208 communicates with P-GW 110 over an S5 interface connection. MME 206 also communicates with MME 106, over an S10 interface connection.

In response to the mobility event 202, a mobility procedure may be performed, according to which UE 102 establishes service connectivity via eNB 204. UE 102 may communicate with the eNB 204 over a Uu interface connection (not shown). If UE 102 is in a connected mode at the time of the mobility event, the mobility procedure may comprise a connected mode mobility procedure such as a handover procedure. If the UE 102 is in an idle mode at the time of the mobility event, the mobility procedure may comprise an idle mode mobility procedure such as a tracking area update procedure or a service request procedure. If UE 102 has established a SIPTO@LN PDN connection to the Internet 120 prior to mobility event 202, it may not be able to use that SIPTO@LN PDN connection following mobility event 202, because it has moved out of range of HeNB 104. As such, it may be desirable that the SIPTO@LN PDN connection be released following the mobility procedure.

Figure 3:
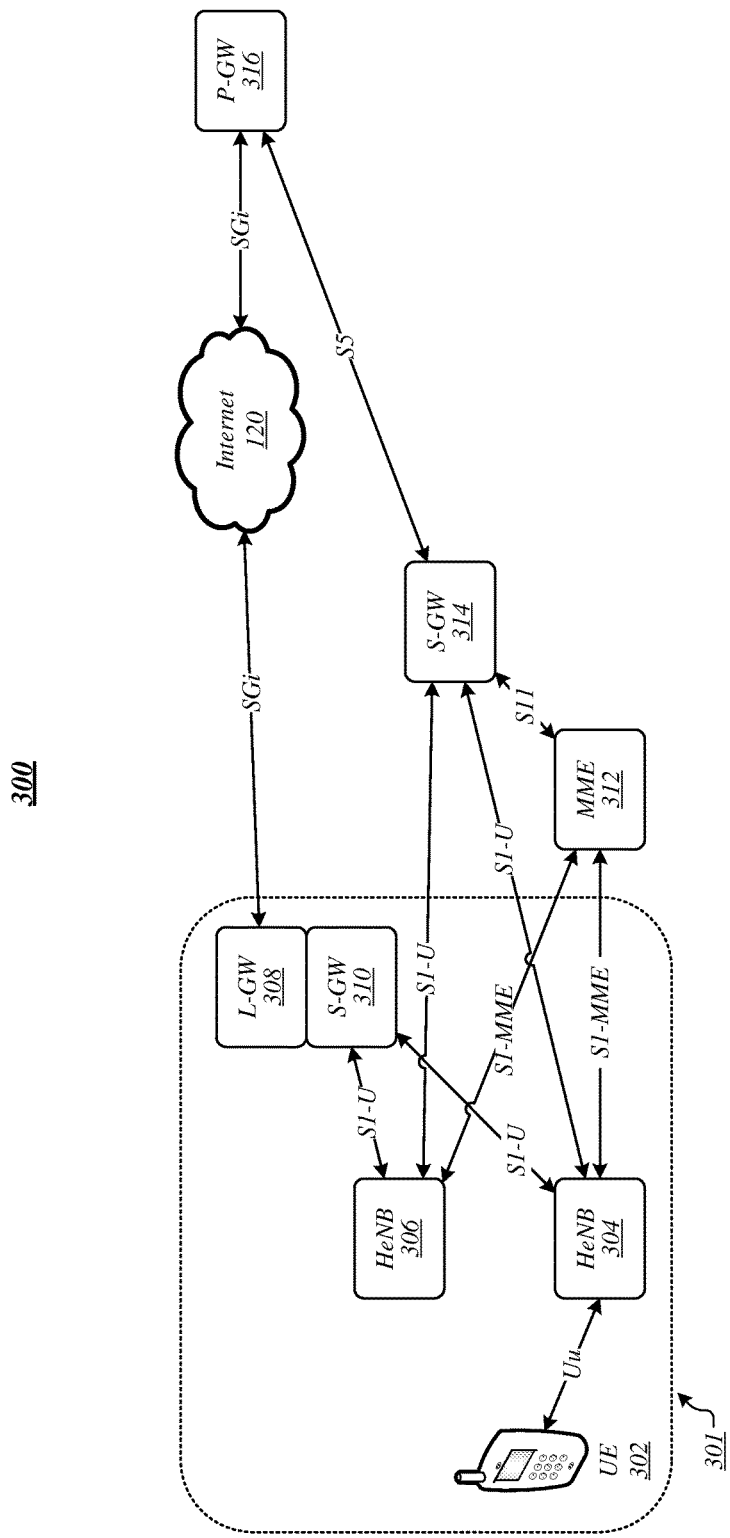
FIG. 3 illustrates an embodiment of a third operating environment.

FIG. 3 illustrates an operating environment 300 such as may be representative of various embodiments. More particularly, operating environment 300 may be representative of some embodiments in which a UE may establish a SIPTO@LN PDN connection through a stand-alone L-GW. As shown in FIG. 3, a local home network (LHN) 301 comprises a UE 302, HeNBs 304 and 306, and an L-GW 308 that is collocated with an S-GW 310. In the example of FIG. 3, HeNB 304 comprises a serving HeNB for UE 302, and communicates with UE 302 over a Uu interface connection. HeNBs 304 and 306 communicate with S-GW 310 over respective S1-U interface connections. Residing outside of LHN 301 are an MME 312, an S-GW 314, and a P-GW 316, each of which may be comprised in a service provider network. HeNBs 304 and 306 communicate with MME 312 over respective S1-MME interface connections, and communicate with S-GW 314 over respective S1-U interface connections. MME 312 communicates with S-GW 314 over an S11 interface connection. S-GW 314 communicates with P-GW 316 over an S5 interface connection. P-GW 316 communicates with the Internet 120 via an SGi interface connection. Rather than communicating with the Internet 120 through P-GW 316, UE 302 may establish a SIPTO@LN PDN connection to the Internet 120 through L-GW 308. Using the SIPTO@LN PDN connection to communicate with the Internet 120 may enable UE 302 to avoid latency associated with usage of the core packet network.

Figure 4:
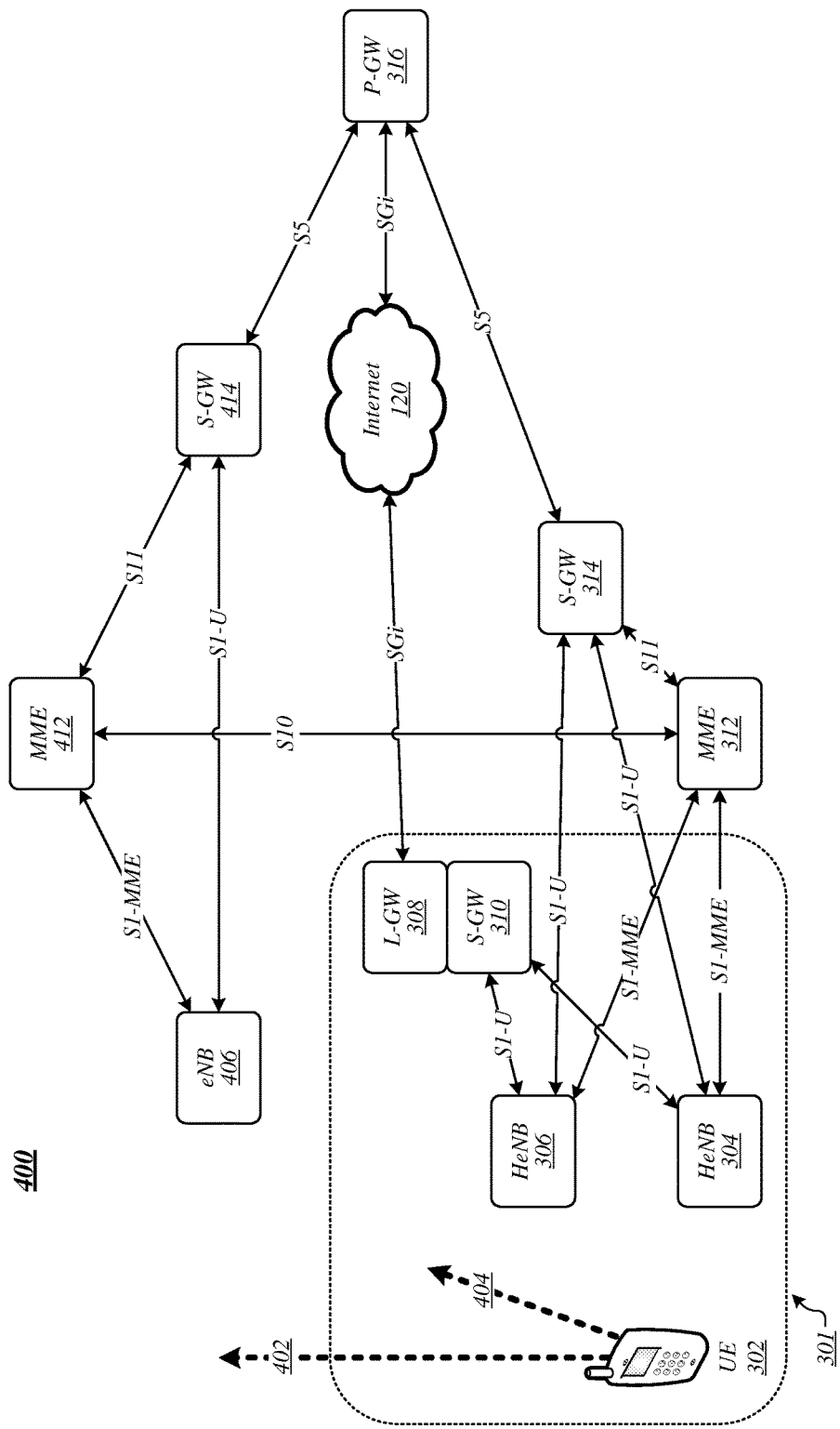
FIG. 4 illustrates an embodiment of a fourth operating environment.

FIG. 4 illustrates an operating environment 400 such as may be representative of various embodiments. More particularly, operating environment 400 depicts two example mobility events such as may be representative of some embodiments in which UE 302 of FIG. 3 moves away from HeNB 304. As shown in FIG. 4, according to a mobility event 402, UE 302 moves outside of LHN 301 and into range of an eNB 406. eNB 406 communicates with an MME 412 over an S1-MME interface connection, and communicates with an S-GW 414 over an S1-U interface connection. MME 412 communicates with S-GW 414 over an S11 interface connection, and S-GW 414 communicates with P-GW 316 over an S5 interface connection. MME 412 also communicates with MME 312, over an S10 interface connection.

As a result of mobility event 402, UE 302 moves away out of range of HeNB 304, and thus is no longer able to obtain service connectivity via HeNB 304. Further, since UE 302 moves outside of LHN 301, it is not able to obtain service connectivity from any other HeNB within LHN 301, such as HeNB 306. As such, in response to the mobility event 402, a mobility procedure may be performed according to which UE 302 establishes service connectivity via eNB 406. UE 302 may communicate with the eNB 406 over a Uu interface connection (not shown). If UE 302 is in a connected mode at the time of the mobility event, the mobility procedure may comprise a connected mode mobility procedure such as a handover procedure. If the UE 302 is in an idle mode at the time of the mobility event, the mobility procedure may comprise an idle mode mobility procedure such as a tracking area update procedure or a service request procedure. If UE 302 has established a SIPTO@LN PDN connection to the Internet 120 prior to mobility event 402, it may not be able to use that SIPTO@LN PDN connection following mobility event 402, because it has moved out of LHN 301 and out of range of HeNBs 304 and 306. As such, it may be desirable that the SIPTO@LN PDN connection be released following the mobility procedure performed in response to mobility event 402.

It is worthy of note that in various embodiments, a mobility event may occur according to which UE 302 moves out of range of HeNB 304 but remains within LHN 301. In some such embodiments, in response to such a mobility event, a mobility procedure may be performed according to which UE 302 establishes service connectivity via another HeNB within LHN 301. For example, following a mobility event 404, a mobility procedure may be performed according to which UE 302 establishes service connectivity via HeNB 306. In such a case, using HeNB 306, UE 302 may still be able to utilize L-GW 308 to communicate with the Internet 120. As such, if UE 302 has established a SIPTO @ LN PDN connection to the Internet 120 prior to mobility event 404, it may still be able to use that SIPTO@LN PDN connection following mobility event 404. Thus, it may be desirable that the SIPTO@LN PDN connection be maintained following the mobility procedure performed in response to mobility event 404.

Disclosed herein are improved connection management techniques for wireless network mobility procedures. According to some such techniques, following a mobility procedure for a UE, a serving MME for the UE may determine whether to release a SIPTO@LN PDN connection of the UE. In various embodiments, the serving MME may determine whether to release the SIPTO@ LN PDN connection based on whether the UE has exited its LHN. In some embodiments, if the serving MME determines that the SIPTO@ LN PDN connection should be released, it may also determine an appropriate procedure for releasing the SIPTO@LN PDN connection, based on whether the UE has any other PDN connections. In various embodiments, the mobility procedure may comprise a tracking area update (TAU) procedure, and the serving MME may comprise a new MME that communicates with an old MME of the UE during the TAU procedure. For example, following a TAU procedure in which MME 312 comprises an old MME for UE 302 and MME 412 comprises a new MME for UE 302, MME 412 may comprise the serving MME for UE 302. In some other embodiments, the mobility procedure may comprise a handover procedure, and the serving MME may comprise a target MME of the handover procedure. For example, following a handover procedure for UE 302 in which MME 312 comprises a source MME and MME 412 comprises a target MME, MME 412 may comprise the serving MME for UE 302.

It is worthy of note that the techniques described herein are not limited to application in embodiments in which the serving MME for the UE changes during the mobility procedure. In various embodiments, the same MME may serve the UE both before and after the mobility procedure, and that MME may determine whether to release the SIPTO@LN PDN connection of the UE. Similarly, a serving S-GW for the UE may or may not change during the mobility procedure. The embodiments are not limited in this context.

Figure 5:
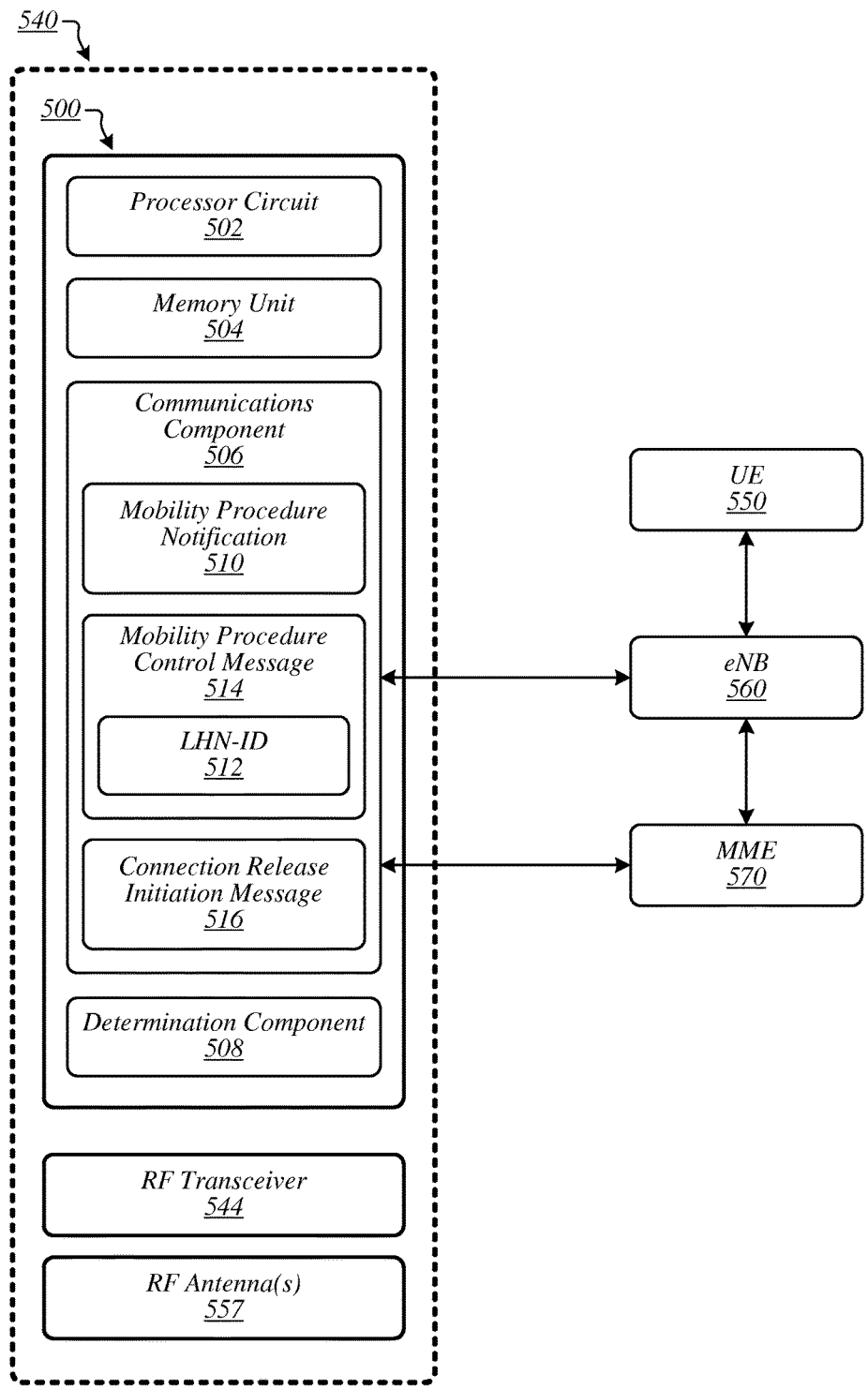
FIG. 5 illustrates an embodiment of an apparatus and an embodiment of a system.

FIG. 5 illustrates a block diagram of an apparatus 500 such as may implement improved connection management techniques for wireless network mobility procedures. As shown in FIG. 5, apparatus 500 comprises multiple elements including a processor circuit 502, a memory unit 504, a communications component 506, and a determination component 508. The embodiments, however, are not limited to the type, number, or arrangement of elements shown in this figure.

In some embodiments, apparatus 500 may comprise processor circuit 502. Processor circuit 502 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 502 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 502 may be implemented as a general purpose processor, such as a processor made by Intel® Corporation, Santa Clara, Calif. The embodiments are not limited in this context.

In various embodiments, apparatus 500 may comprise or be arranged to communicatively couple with a memory unit 504. Memory unit 504 may be implemented using any machine-readable or computer-readable media capable of storing data, including both volatile and non-volatile memory. For example, memory unit 504 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

It is worthy of note that some portion or all of memory unit 504 may be included on the same integrated circuit as processor circuit 502, or alternatively some portion or all of memory unit 504 may be disposed on an integrated circuit or other medium, for example a hard disk drive, that is external to the integrated circuit of processor circuit 502. Although memory unit 504 is comprised within apparatus 500 in FIG. 5, memory unit 504 may be external to apparatus 500 in some embodiments. The embodiments are not limited in this context.

In some embodiments, apparatus 500 may comprise a communications component 506. Communications component 506 may comprise logic, circuitry, and/or instructions operative to send messages to one or more remote devices and/or to receive messages from one or more remote devices. In various embodiments, communications component 506 may be operative to send and/or receive messages over one or more wired connections, one or more wireless connections, or a combination of both. In some embodiments, communications component 506 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In various embodiments, apparatus 500 and/or system 540 may comprise a determination component 508. Determination component 508 may be operative to perform various types of determinations and/or decisions in support of mobility management operations performed by apparatus 500 and/or system 540. In some embodiments, determination component 508 may be operative to perform one or more determinations and/or decisions effecting the establishment, activation, and/or release of one or more connections of one or more UEs in a wireless network for which apparatus 500 and/or system 540 comprises an MME. The embodiments are not limited in this context.

FIG. 5 also illustrates a block diagram of a system 540. System 540 may comprise any of the aforementioned elements of apparatus 500. System 540 may further comprise a radio frequency (RF) transceiver 544. RF transceiver 544 may comprise one or more radios capable of transmitting and receiving signals using various suitable wireless communications techniques. Such techniques may involve communications across one or more wireless networks.

Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 544 may operate in accordance with one or more applicable standards in any version. The embodiments are not limited in this context.

In some embodiments, system 540 may comprise one or more RF antennas 557. Examples of any particular RF antenna 557 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 544 may be operative to send and/or receive messages and/or data using one or more RF antennas 557. The embodiments are not limited in this context.

In various embodiments, apparatus 500 and/or system 540 may comprise an MME. More particularly, apparatus 500 and/or system 540 may comprise a serving MME for a UE 550, following a mobility procedure performed in response to a mobility event of that UE 550. In some embodiments, the mobility procedure may comprise a TAU procedure. In various such embodiments, apparatus 500 and/or system 540 may comprise a new MME that communicates with an old MME of the UE 550 during the TAU procedure. In some other embodiments, apparatus 500 and/or system 540 may also comprise the serving MME for the UE prior to the TAU procedure. In various embodiments, the mobility procedure may comprise a handover procedure. In some such embodiments, apparatus 500 and/or system 540 may comprise a target MME of the handover procedure. In various other embodiments, the serving MME of the UE may not change during the handover procedure, and thus apparatus 500 and/or system 540 may also comprise the serving MME for the UE prior to the handover procedure. The embodiments are not limited in this context.

In some embodiments, during a mobility procedure for UE 550, communications component 506 may be operative to receive a mobility procedure notification 510. Mobility procedure notification 510 may comprise a message generally indicating that the mobility procedure has been initiated for UE 550. In various embodiments, the mobility procedure may comprise a TAU procedure, and mobility procedure notification 510 may comprise a TAU request message received from an eNB 560 that comprises a serving eNB for UE 550 following the TAU procedure. In some other embodiments, the mobility procedure may comprise a handover procedure, and mobility procedure notification 510 may comprise a forward relocation request received from an MME 570 that comprises a serving MME for UE 550 prior to the handover procedure. In still other embodiments, the mobility procedure may comprise a handover procedure, and mobility procedure notification 510 may comprise a handover required message received from an eNB that comprises a serving eNB for UE 550 prior to the handover procedure. The embodiments are not limited in this context.

In various embodiments, prior to the mobility procedure, UE 550 may have established a SIPTO@LN PDN connection. In some embodiments, determination component 508 may be operative to determine whether to release the SIPTO@LN PDN connection of the UE 550 following the mobility procedure. In various embodiments, determination component 508 may be operative to determine whether to release the SIPTO@LN PDN connection of the UE 550 based on an LHN-ID 512 for the UE 550. In some embodiments, determination component 508 may be operative to determine to release the SIPTO @ LN PDN connection in response to a determination, based on the LHN-ID 512, that the mobility procedure causes an LHN for the UE 550 to change. In various embodiments, determination component 508 may be operative to determine not to release the SIPTO@LN PDN connection in response to a determination, based on the LHN-ID 512, that the mobility procedure does not cause the LHN for the UE 550 to change.

In some embodiments, communications component 506 may be operative to receive a mobility procedure control message 514 that contains LHN-ID 512. In various embodiments, the mobility procedure control message 514 may comprise a same message as mobility procedure notification 510. For example, in some embodiments, the mobility procedure may comprise a handover procedure, and mobility procedure notification 510 may comprise a forward relocation request message that contains the LHN-ID 512. In various other embodiments, the mobility procedure control message 514 may comprise a different message than mobility procedure notification 510. For example, in some embodiments, the mobility procedure may comprise a TAU procedure, mobility procedure notification 510 may comprise a TAU request message, and the mobility procedure control message 514 may comprise a context response message that contains the LHN-ID 512. In still other embodiments, communications component 506 may not be operative to receive a mobility procedure control message 514 containing LHN-ID 512. For example, in various embodiments, apparatus 500 and/or system 540 may comprise the serving MME for UE 550 prior to the mobility procedure as well as following the mobility procedure, and determination component 508 may be operative to retrieve LHN-ID 512 from storage in memory unit 504. It is to be appreciated that although the example of FIG. 5 illustrates a mobility procedure control message 514 that contains LHN-ID 512, and depicts the mobility procedure control message 514 as being distinct from mobility procedure notification 510, the embodiments are not limited to this example.

In some embodiments, in response to a determination that the SIPTO@LN PDN connection for UE 550 is to be released, determination component 508 may be operative to select a process for releasing that SIPTO@LN PDN connection. In various embodiments, determination component 508 may be operative to select the process for releasing the SIPTO@LN PDN connection based on a determination of whether the SIPTO@LN PDN connection comprises the only PDN connection for UE 550. In some embodiments, in response to a determination that the SIPTO@LN PDN connection comprises the only PDN connection for UE 550, determination component 508 may be operative to select an MME-initiated detach process for releasing the SIPTO@LN PDN connection. In various embodiments, in response to a determination that the SIPTO@LN PDN connection does not comprise the only PDN connection for UE 550, determination component 508 may be operative to select an MME-requested PDN disconnection process for releasing the SIPTO@LN PDN connection. The embodiments are not limited in this context.

In some embodiments, following the mobility procedure, communications component 506 may be operative to send a connection release initiation message 516 in order to initiate release of the SIPTO@LN PDN connection according to the selected process. In various embodiments, the selected process may comprise an MME-initiated detach process and connection release initiation message 516 may comprise a detach request message. In some other embodiments, the selected process may comprise an MME-requested PDN disconnection process, and connection release initiation message 516 may comprise a delete session request message. In various embodiments, connection release initiation message 516 may indicate that the MME-requested PDN disconnection process is to be initiated with a reactivation requested cause. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
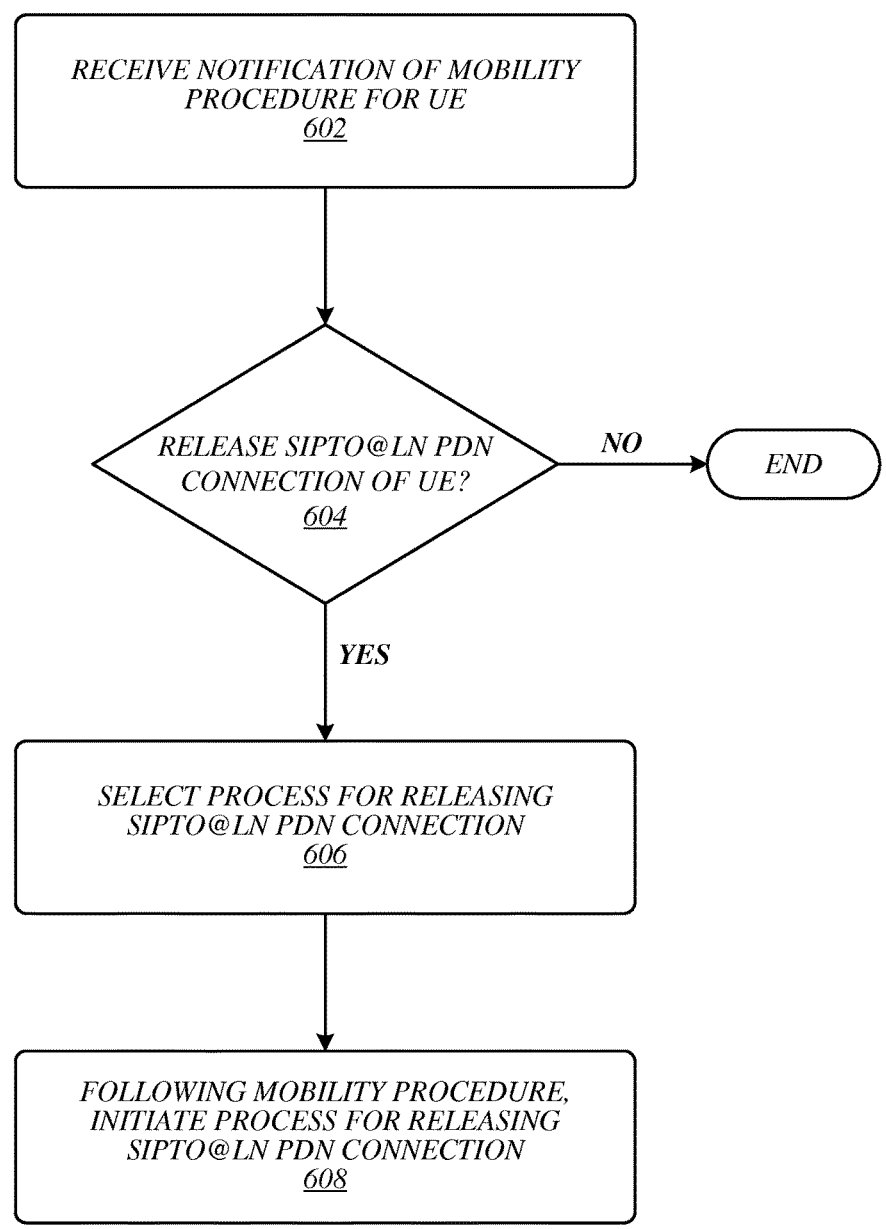
FIG. 6 illustrates an embodiment of a first logic flow.

FIG. 6 illustrates one embodiment of a logic flow 600, which may be representative of the operations executed by one or more embodiments described herein, such as operations that may be executed by apparatus 500 and/or system 540 of FIG. 5. More particularly, logic flow may 600 may be representative of some embodiments in which apparatus 500 and/or system 540 comprises a serving MME for a UE following a mobility procedure for that UE. As shown in logic flow 600, a notification of a mobility procedure for a UE may be received at 602. For example, communications component 506 of FIG. 5 may be operative to receive a mobility procedure notification 510 indicating the initiation of a mobility procedure for UE 550. At 604, it may be determined whether to release a SIPTO@ LN PDN connection of the UE. For example, determination component 508 of FIG. 5 may be operative to determine whether to release a SIPTO@LN PDN connection of UE 550. If it is determined at 604 that the SIPTO@LN PDN connection is not to be released, the logic flow may end. If it is determined at 604 that the SIPTO@LN PDN connection is to be released, flow may pass to 606.

At 606, a process may be selected for releasing the SIPTO@LN PDN connection. For example, determination component 508 of FIG. 5 may be operative to select a process for releasing a SIPTO@LN PDN connection of UE 550, based on whether the SIPTO@LN PDN connection is the only PDN connection for UE 550. At 608, following the mobility procedure, the selected process for releasing the SIPTO@LN PDN connection may be initiated. For example, following the mobility procedure for UE 550 of FIG. 5, communications component 506 may be operative to send connection release initiation message 516 to initiate a selected process for releasing a SIPTO@LN PDN connection of UE 550. The embodiments are not limited to these examples.

Figure 7:
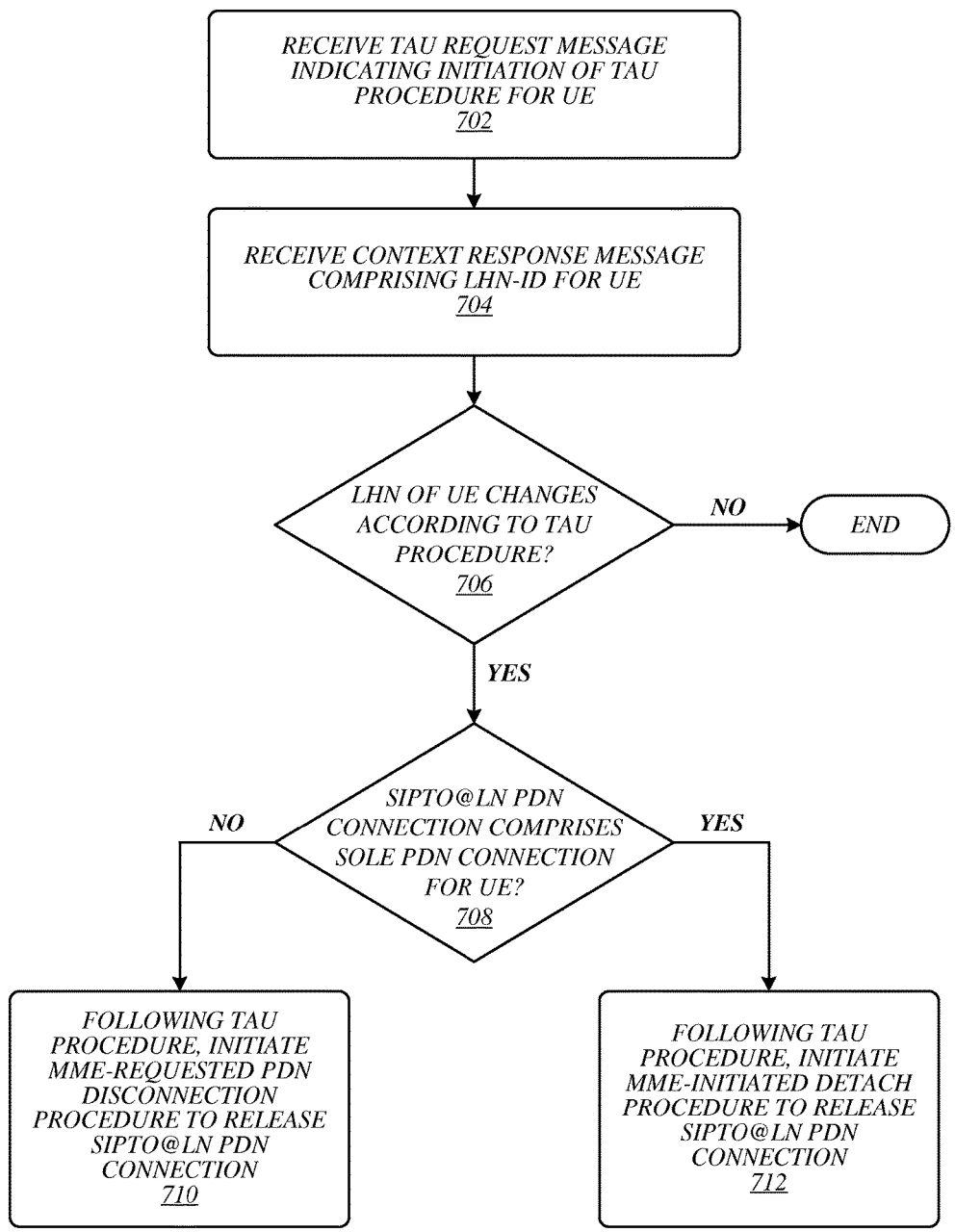
FIG. 7 illustrates an embodiment of a second logic flow.

FIG. 7 illustrates one embodiment of a logic flow 700, which may be representative of the operations executed by one or more embodiments described herein, such as operations that may be executed by apparatus 500 and/or system 540 of FIG. 5. More particularly, logic flow may 700 may be representative of various embodiments in which apparatus 500 and/or system 540 comprises a new MME of a UE in a TAU procedure for that UE. As shown in logic flow 700, a TAU request message that indicates an initiation of a TAU procedure for a UE may be received at 702. For example, communications component 506 of FIG. 5 may be operative to receive a mobility procedure notification 510 that comprises a TAU request message that indicates an initiation of a TAU procedure for UE 550. At 704, a context response message may be received that comprises an LHN-ID for the UE. For example, communications component 506 of FIG. 5 may be operative to receive a mobility procedure control message 514 that comprises a context response message and includes an LHN-ID for UE 550. At 706 it may be determined whether an LHN of the UE changes according to the TAU procedure. For example, determination component 508 of FIG. 5 may be operative to determine, based on LHN-ID 512, whether an LHN of UE 550 changes according to a TAU procedure for UE 550. If it is determined at 706 that the LHN of the UE does not change according to the TAU procedure, the logic flow may end. If it is determined at 706 that the LHN of the UE changes according to the TAU procedure, flow may pass to 708.

At 708, it may be determined whether a SIPTO@LN PDN connection of the UE comprises a sole PDN connection of the UE. For example, determination component 508 of FIG. 5 may be operative to determine whether a SIPTO@LN PDN connection of UE 550 comprises a sole PDN connection of UE 550. If it is determined at 708 that the SIPTO@LN PDN connection does not comprise the sole PDN connection of the UE, flow may pass to 710. At 710, following the TAU procedure for the UE, an MME-requested PDN disconnection procedure may be initiated to release the SIPTO@LN PDN connection of the UE. For example, following a TAU procedure for UE 550 of FIG. 5, communications component 506 may be operative to initiate an MME-requested PDN disconnection procedure by sending a connection release initiation message 516 comprising a delete session request message in order to release a SIPTO@LN PDN connection of UE 550. If it is determined at 708 that the SIPTO@LN PDN connection comprises the sole PDN connection of the UE, flow may pass to 712. At 712, following the TAU procedure for the UE, an MME-initiated detach procedure may be initiated to release the SIPTO@LN PDN connection of the UE. For example, following a TAU procedure for UE 550 of FIG. 5, communications component 506 may be operative to initiate an MME-initiated detach procedure by sending a connection release initiation message 516 comprising a detach request message in order to release a SIPTO@LN PDN connection of UE 550. The embodiments are not limited to these examples.

Figure 8:
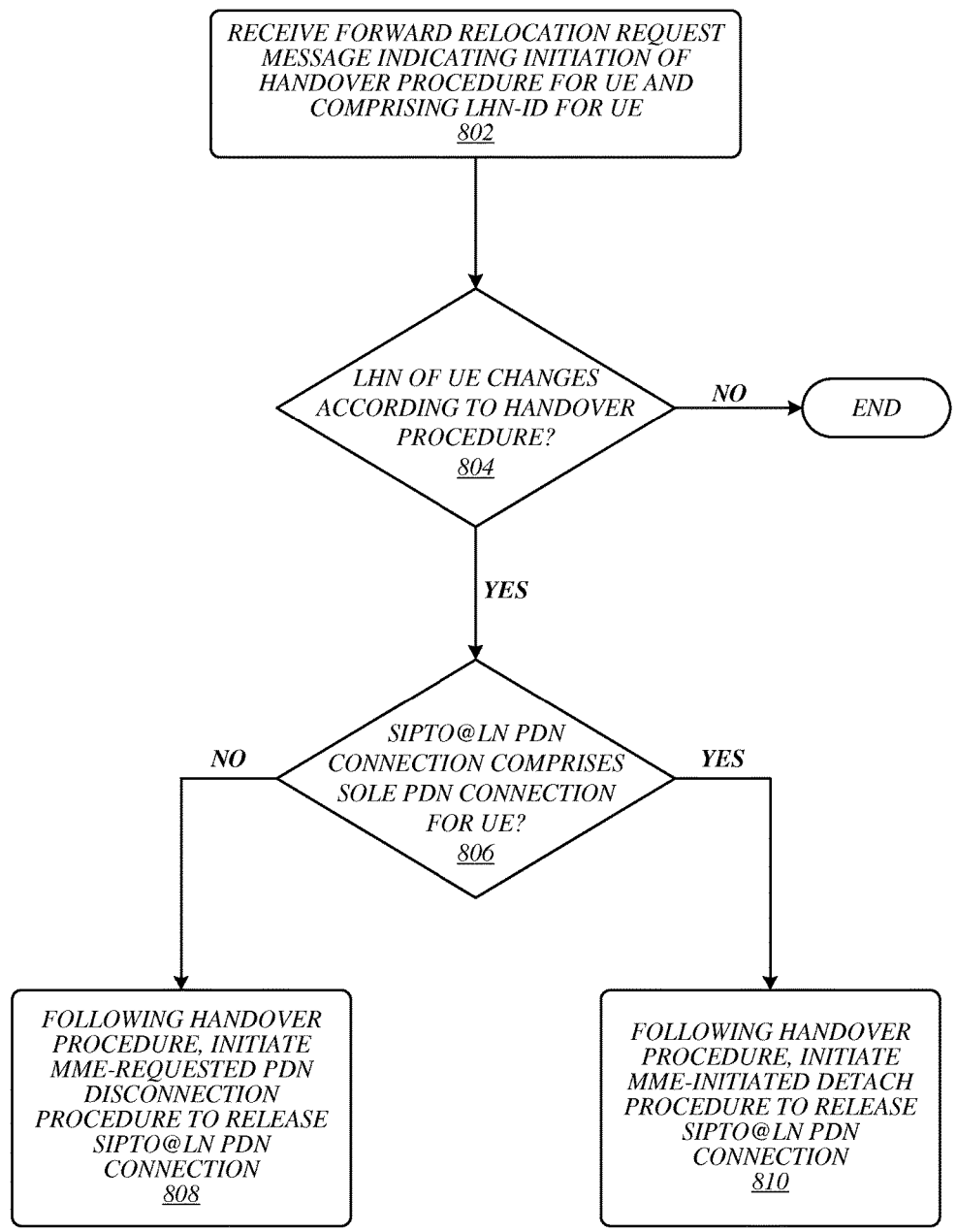
FIG. 8 illustrates an embodiment of a third logic flow.

FIG. 8 illustrates one embodiment of a logic flow 800, which may be representative of the operations executed by one or more embodiments described herein, such as operations that may be executed by apparatus 500 and/or system 540 of FIG. 5. More particularly, logic flow may 800 may be representative of some embodiments in which apparatus 500 and/or system 540 comprises a target MME of a handover procedure for a UE. As shown in logic flow 800, a forward relocation request message may be received at 802 that indicates an initiation of a handover procedure for a UE and comprises an LHN-ID for the UE. For example, communications component 506 of FIG. 5 may be operative to receive a mobility procedure notification 510 that comprises a forward relocation request message containing an LHN-ID 512 of UE 550 and indicating an initiation of a handover procedure for UE 550. At 804 it may be determined whether an LHN of the UE changes according to the handover procedure. For example, determination component 508 of FIG. 5 may be operative to determine, based on LHN-ID 512, whether an LHN of UE 550 changes according to a handover procedure for UE 550. If it is determined at 804 that the LHN of the UE does not change according to the handover procedure, the logic flow may end. If it is determined at 804 that the LHN of the UE changes according to the handover procedure, flow may pass to 806.

At 806, it may be determined whether a SIPTO@LN PDN connection of the UE comprises a sole PDN connection of the UE. For example, determination component 508 of FIG. 5 may be operative to determine whether a SIPTO@LN PDN connection of UE 550 comprises a sole PDN connection of UE 550. If it is determined at 806 that the SIPTO@LN PDN connection does not comprise the sole PDN connection of the UE, flow may pass to 808. At 808, following the handover procedure for the UE, an MME-requested PDN disconnection procedure may be initiated to release the SIPTO@LN PDN connection of the UE. For example, following a handover procedure for UE 550 of FIG. 5, communications component 506 may be operative to initiate an MME-requested PDN disconnection procedure by sending a connection release initiation message 516 comprising a delete session request message in order to release a SIPTO@LN PDN connection of UE 550. If it is determined at 806 that the SIPTO@LN PDN connection comprises the sole PDN connection of the UE, flow may pass to 810. At 810, following the handover procedure for the UE, an MME-initiated detach procedure may be initiated to release the SIPTO@LN PDN connection of the UE. For example, following a handover procedure for UE 550 of FIG. 5, communications component 506 may be operative to initiate an MME-initiated detach procedure by sending a connection release initiation message 516 comprising a detach request message in order to release a SIPTO@LN PDN connection of UE 550. The embodiments are not limited to these examples.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flow 600 of FIG. 6, logic flow 700 of FIG. 7, and logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
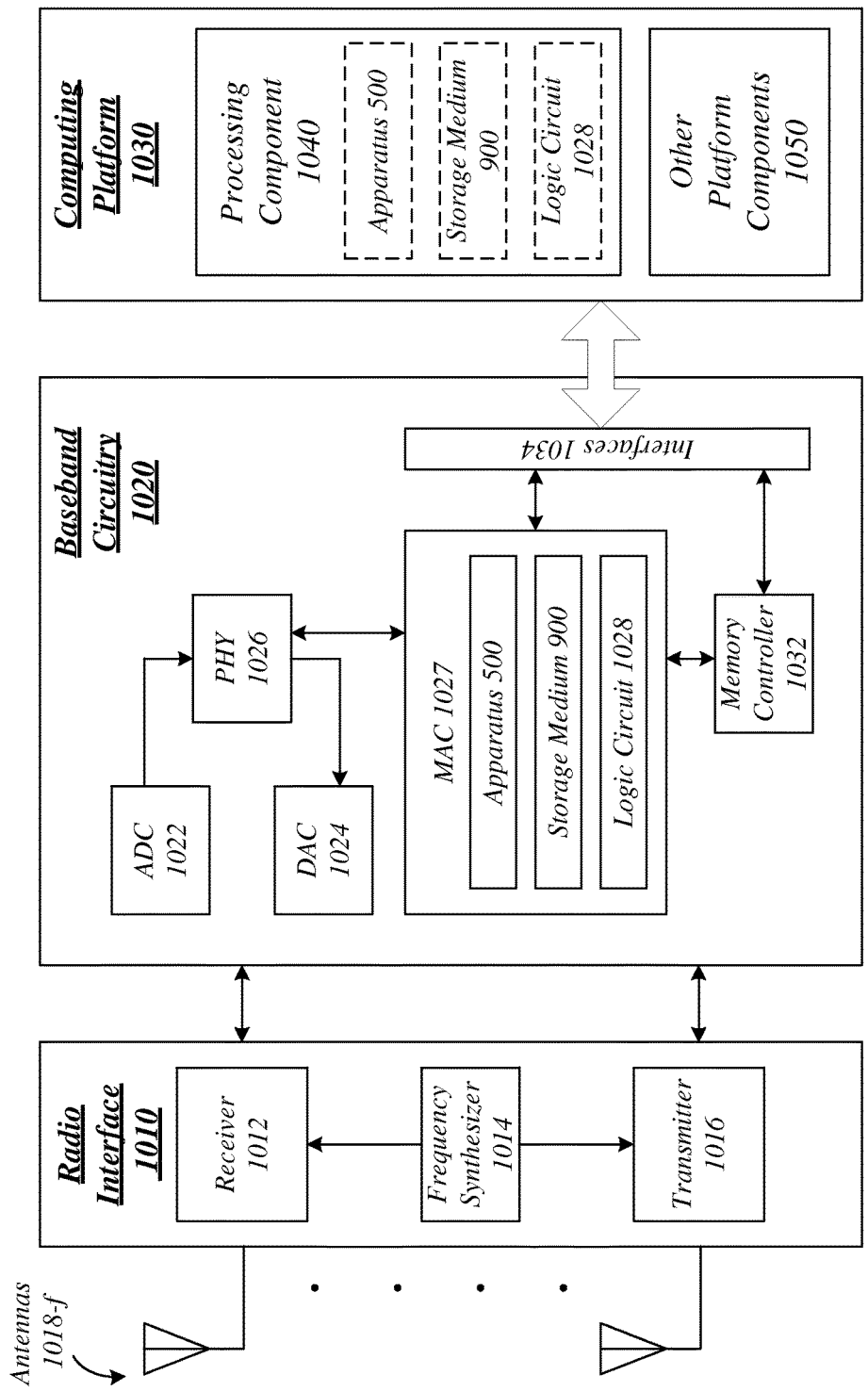
FIG. 10 illustrates an embodiment of a device.

FIG. 10 illustrates an embodiment of a communications device 1000 that may implement one or more of apparatus 500 and/or system 540 of FIG. 5, logic flow 600 of FIG. 6, logic flow 700 of FIG. 7, logic flow 800 of FIG. 8, and/or storage medium 900 of FIG. 9. In various embodiments, device 1000 may comprise a logic circuit 1028. The logic circuit 1028 may include physical circuits to perform operations described for one or more of apparatus 500 and/or system 540 of FIG. 5, logic flow 600 of FIG. 6, logic flow 700 of FIG. 7, and logic flow 800 of FIG. 8, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of apparatus 500 and/or system 540 of FIG. 5, logic flow 600 of FIG. 6, logic flow 700 of FIG. 7, logic flow 800 of FIG. 8, storage medium 900 of FIG. 9, and logic circuit 1028 in a single computing entity, such as entirely within a single device. Alternatively, the device 1000 may distribute portions of the structure and/or operations for one or more of apparatus 500 and/or system 540 of FIG. 5, logic flow 600 of FIG. 6, logic flow 700 of FIG. 7, logic flow 800 of FIG. 8, storage medium 900 of FIG. 9, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-$f$. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of apparatus 500 and/or system 540 of FIG. 5, logic flow 600 of FIG. 6, logic flow 700 of FIG. 7, logic flow 800 of FIG. 8, storage medium 900 of FIG. 9, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-f) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
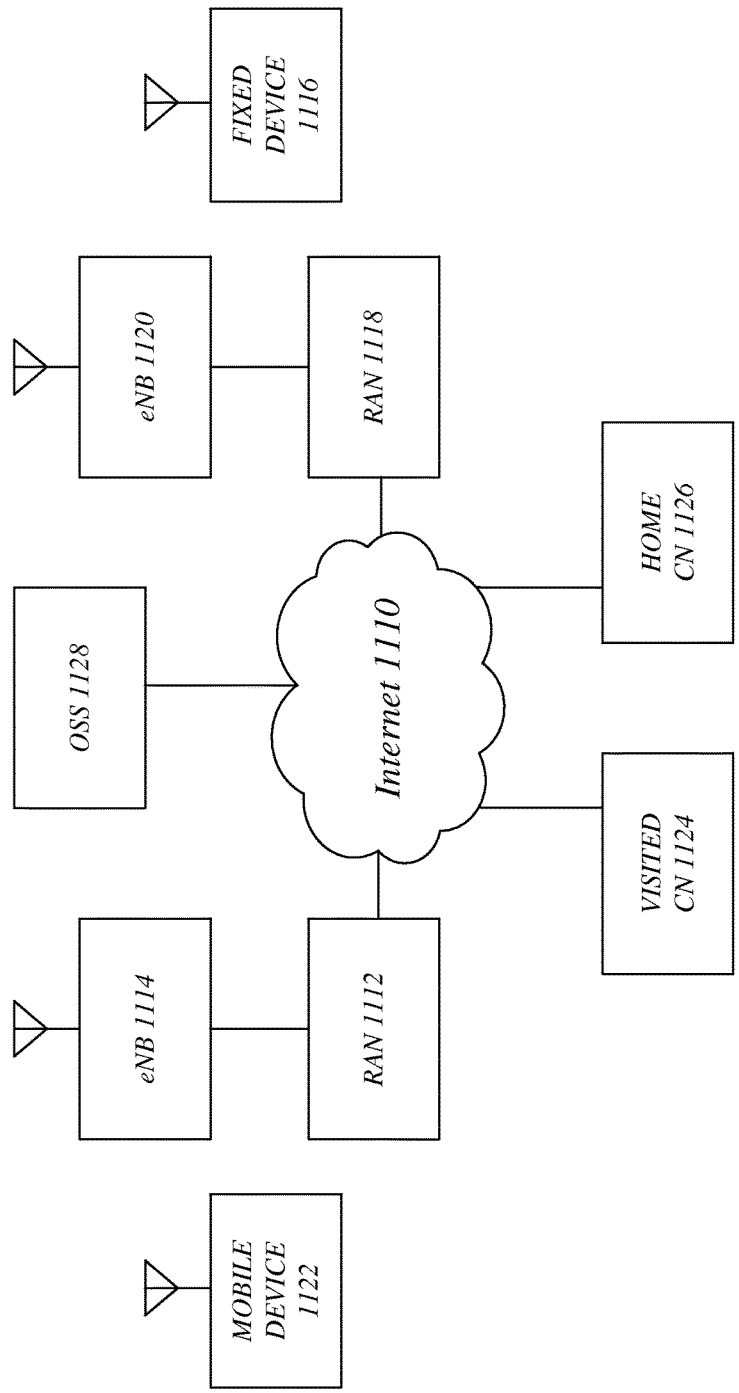
FIG. 11 illustrates an embodiment of wireless network.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1000 of FIG. 10, with the fixed device 1116 comprising a stationary version of device 1000 and the mobile device 1122 comprising a mobile version of device 1000. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1000, and may comprise, for example, the PHY and MAC layer equipment in compliance with a 3GPP LTE Specification or an IEEE 802.16 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an evolved packet core (EPC) node, comprising a processor circuit to receive a notification of a mobility procedure for a user equipment (UE), determine whether to release a local gateway (L-GW)-provided packet data network (PDN) connection of the UE, and in response to a determination that the L-GW-provided PDN connection is to be released, send either a detach request message or a delete session request message to initiate a process to release the L-GW-provided PDN connection.

In Example 2, the L-GW-provided PDN connection of Example 1 may optionally comprise a selected internet protocol traffic offload at local network (SIPTO@LN) PDN connection.

In Example 3, the processor circuit of any of Examples 1 to 2 may optionally send a detach request message to initiate a mobility management entity (MME)-initiated detach process to release the L-GW-provided PDN connection in response to a determination that the L-GW-provided PDN connection comprises an only PDN connection of the UE.

In Example 4, the processor circuit of any of Examples 1 to 2 may optionally send a delete session request message to initiate a mobility management entity (MME)-requested PDN disconnection process to release the L-GW-provided PDN connection in response to a determination that the L-GW-provided PDN connection does not comprise an only PDN connection of the UE.

In Example 5, the processor circuit of Example 4 may optionally send the delete session request message with a reactivation requested cause.

In Example 6, the processor circuit of any of Examples 1 to 5 may optionally send either the detach request message or the delete session request message following the mobility procedure.

In Example 7, the mobility procedure of any of Examples 1 to 6 may optionally comprise a tracking area update (TAU).

In Example 8, the mobility procedure of any of Examples 1 to 6 may optionally comprise a handover.

Example 9 is the EPC node of any of Examples 1 to 8, comprising a radio frequency (RF) transceiver, and one or more RF antennas.

Example 10 is at least one non-transitory computer-readable storage medium comprising a set of wireless connection management instructions that, in response to being executed on a mobility management entity (MME), cause the MME to receive, during a mobility procedure for a user equipment (UE), a mobility procedure control message, determine to release a selected internet protocol traffic offload at local network (SIPTO@LN) packet data network (PDN) connection of the UE based on the mobility procedure control message, and following the mobility procedure, trigger a deactivation of the SIPTO@LN PDN connection.

In Example 11, the at least one non-transitory computer-readable storage medium of Example 10 may optionally comprise wireless connection management instructions that, in response to being executed on the MME, cause the MME to trigger the deactivation of the SIPTO@LN PDN connection by initiating an MME-requested PDN disconnection procedure in response to a determination that the SIPTO @ LN PDN connection does not comprise an only PDN connection of the UE.

In Example 12, the at least one non-transitory computer-readable storage medium of Example 11 may optionally comprise wireless connection management instructions that, in response to being executed on the MME, cause the MME to initiate the MME-requested PDN disconnection procedure with a reactivation requested cause.

In Example 13, the at least one non-transitory computer-readable storage medium of Example 10 may optionally comprise wireless connection management instructions that, in response to being executed on the MME, cause the MME to trigger the deactivation of the SIPTO@LN PDN connection by initiating an MME-initiated detach procedure in response to a determination that the SIPTO@LN PDN connection comprises an only PDN connection of the UE.

In Example 14, the mobility procedure of any of Examples 10 to 13 may optionally comprise a tracking area update (TAU) procedure, and the mobility procedure control message may optionally comprise a context response message.

In Example 15, the mobility procedure of any of Examples 10 to 13 may optionally comprise a handover procedure, and the mobility procedure control message may optionally comprise a forward relocation request message.

In Example 16, the at least one non-transitory computer-readable storage medium of any of Examples 10 to 15 may optionally comprise wireless connection management instructions that, in response to being executed on the MME, cause the MME to receive the mobility procedure control message from a previous serving MME of the UE.

In Example 17, the at least one non-transitory computer-readable storage medium of any of Examples 10 to 16 may optionally comprise wireless connection management instructions that, in response to being executed on the MME, cause the MME to receive the mobility procedure control message over an S10 interface connection.

Example 18 is a wireless connection management method, comprising receiving a notification of a tracking area update (TAU) procedure for a user equipment (UE), during the TAU procedure, receiving a context response message identifying a selected internet protocol traffic offload at local network (SIPTO@LN) packet data network (PDN) connection of the UE and identifying a local home network identifier (LHN-ID) for the UE, and determining, by a processor circuit, whether to prompt a release of the SIPTO@LN PDN connection based on the LHN-ID.

In Example 19, the wireless connection management method of Example 18 may optionally comprise determining not to prompt the release of the SIPTO@LN PDN connection in response to a determination, based on the LHN-ID, that a local home network of the UE does not change according to the TAU procedure.

In Example 20, the wireless connection management method of Example 18 may optionally comprise determining to prompt the release of the SIPTO@LN PDN connection in response to a determination, based on the LHN-ID, that a local home network of the UE changes according to the TAU procedure.

In Example 21, the wireless connection management method of Example 20 may optionally comprise determining whether the SIPTO@LN PDN connection is a sole PDN connection for the UE.

In Example 22, the wireless connection management method of Example 21 may optionally comprise prompting the release of the SIPTO@LN PDN connection by commencing a PDN disconnection procedure based on a determination that the SIPTO @ LN PDN connection is not the sole PDN connection for the UE.

In Example 23, the wireless connection management method of Example 22, may optionally comprise commencing the PDN disconnection procedure with a reactivation requested cause.

In Example 24, the wireless connection management method of Example 21 may optionally comprise prompting the release of the SIPTO@LN PDN connection by commencing a detach procedure based on a determination that the SIPTO @ LN PDN connection is the sole PDN connection for the UE.

In Example 25, the wireless connection management method of any of Examples 18 to 23 may optionally comprise receiving the context response message from an old MME of the UE.

Example 26 is at least one non-transitory computer-readable storage medium comprising a set of instructions that, in response to being executed on a computing device, cause the computing device to perform a wireless connection management method according to any of Examples 18 to 25.

Example 27 is an apparatus, comprising means for performing a wireless connection management method according to any of Examples 18 to 25.

Example 28 is a system, comprising an apparatus according to Example 27, a radio frequency (RF) transceiver, and one or more RF antennas.

Example 29 is a mobility management entity (MME), comprising logic, at least a portion of which is in hardware, the logic to receive, during a mobility procedure for a user equipment (UE), a mobility procedure control message, determine to release a selected internet protocol traffic offload at local network (SIPTO@LN) packet data network (PDN) connection of the UE based on the mobility procedure control message, and following the mobility procedure, trigger a deactivation of the SIPTO@LN PDN connection.

In Example 30, the logic of Example 29 may optionally trigger the deactivation of the SIPTO@LN PDN connection by initiating an MME-requested PDN disconnection procedure in response to a determination that the SIPTO @ LN PDN connection does not comprise an only PDN connection of the UE.

In Example 31, the logic of Example 30 may optionally initiate the MME-requested PDN disconnection procedure with a reactivation requested cause.

In Example 32, the logic of Example 29 may optionally trigger the deactivation of the SIPTO@LN PDN connection by initiating an MME-initiated detach procedure in response to a determination that the SIPTO@LN PDN connection comprises an only PDN connection of the UE.

In Example 33, the mobility procedure of any of Examples 29 to 32 may optionally comprise a tracking area update (TAU) procedure, and the mobility procedure control message may optionally comprise a context response message.

In Example 34, the mobility procedure of any of Examples 29 to 32 may optionally comprise a handover procedure, and the mobility procedure control message may optionally comprise a forward relocation request message.

In Example 35, the logic of any of Examples 29 to 34 may optionally receive the mobility procedure control message from a previous serving MME of the UE.

In Example 36, the logic of any of Examples 29 to 35 may optionally receive the mobility procedure control message over an S10 interface connection.

Example 37 is the MME of any of Examples 29 to 36, comprising a radio frequency (RF) transceiver, and one or more RF antennas.

Example 38 is at least one non-transitory computer-readable storage medium comprising a set of wireless connection management instructions that, in response to being executed on a mobility management entity (MME), cause the MME to receive a notification of a tracking area update (TAU) procedure for a user equipment (UE), during the TAU procedure, receive a context response message identifying a selected internet protocol traffic offload at local network (SIPTO@LN) packet data network (PDN) connection of the UE and identifying a local home network identifier (LHN-ID) for the UE, and determine whether to prompt a release of the SIPTO@LN PDN connection based on the LHN-ID.

In Example 39, the at least one non-transitory computer-readable storage medium of Example 38 may optionally comprise wireless connection management instructions that, in response to being executed on the MME, cause the MME to determine not to prompt the release of the SIPTO@LN PDN connection in response to a determination, based on the LHN-ID, that a local home network of the UE does not change according to the TAU procedure.

In Example 40, the at least one non-transitory computer-readable storage medium of Example 38 may optionally comprise wireless connection management instructions that, in response to being executed on the MME, cause the MME to determine to prompt the release of the SIPTO@LN PDN connection in response to a determination, based on the LHN-ID, that a local home network of the UE changes according to the TAU procedure.

In Example 41, the at least one non-transitory computer-readable storage medium of Example 40 may optionally comprise wireless connection management instructions that, in response to being executed on the MME, cause the MME to determine whether the SIPTO@LN PDN connection is a sole PDN connection for the UE.

In Example 42, the at least one non-transitory computer-readable storage medium of Example 41 may optionally comprise wireless connection management instructions that, in response to being executed on the MME, cause the MME to prompt the release of the SIPTO@LN PDN connection by commencing a PDN disconnection procedure based on a determination that the SIPTO@LN PDN connection is not the sole PDN connection for the UE.

In Example 43, the at least one non-transitory computer-readable storage medium of Example 42 may optionally comprise wireless connection management instructions that, in response to being executed on the MME, cause the MME to commence the PDN disconnection procedure with a reactivation requested cause.

In Example 44, the at least one non-transitory computer-readable storage medium of Example 41 may optionally comprise wireless connection management instructions that, in response to being executed on the MME, cause the MME to prompt the release of the SIPTO@LN PDN connection by commencing a detach procedure based on a determination that the SIPTO@LN PDN connection is the sole PDN connection for the UE.

In Example 45, the MME of any of Examples 38 to 44 may optionally comprise a new MME of the UE following the TAU procedure, and the MME may optionally receive the context response message from an old MME of the UE.

Example 46 is a wireless connection management method, comprising receiving, at a target mobility management entity (MME) for a handover of a user equipment (UE), a forward relocation request, determining, by a processor circuit, that a local gateway (L-GW)-provided packet data network (PDN) connection for the UE is to be disconnected based on the forward relocation request, and selecting a process for disconnecting the L-GW-provided PDN connection based on a determination of whether the L-GW-provided PDN connection comprises a lone PDN connection for the UE.

In Example 47, the L-GW-provided PDN connection of Example 46 may optionally comprise a selected internet protocol traffic offload at local network (SIPTO@LN) PDN connection.

In Example 48, the wireless connection management method of any of Examples 46 to 47 may optionally comprise disconnecting the L-GW-provided PDN connection following the handover of the UE, by initiating the selected process.

In Example 49, the wireless connection management method of any of Examples 46 to 48 may optionally comprise selecting an MME-initiated detach process in response to a determination that the L-GW-provided PDN connection comprises the lone PDN connection for the UE.

In Example 50, the wireless connection management method of any of Examples 46 to 48 may optionally comprise selecting an MME-requested PDN disconnection process in response to a determination that the L-GW-provided PDN connection does not comprise the lone PDN connection for the UE.

In Example 51, the wireless connection management method of Example 50 may optionally comprise initiating the MME-requested PDN disconnection process with a reactivation requested cause.

In Example 52, the wireless connection management method of any of Examples 46 to 51 may optionally comprise receiving the forward relocation request from a source MME for the handover of the UE.

In Example 53, the wireless connection management method of any of Examples 46 to 52 may optionally comprise determining that the L-GW-provided PDN connection for the UE is to be disconnected based on the forward relocation request and on a determination that a local home network (LHN) of the UE does not change during the handover of the UE.

Example 54 is at least one non-transitory computer-readable storage medium comprising a set of instructions that, in response to being executed on a computing device, cause the computing device to perform a wireless connection management method according to any of Examples 46 to 53.

Example 55 is an apparatus, comprising means for performing a wireless connection management method according to any of Examples 46 to 53.

Example 56 is a system, comprising an apparatus according to Example 55, a radio frequency (RF) transceiver, and one or more RF antennas.

Example 57 is a mobility management entity (MME), comprising a processor circuit to receive a notification of a tracking area update (TAU) procedure for a user equipment (UE), receive, during the TAU procedure, a context response message identifying a selected internet protocol traffic offload at local network (SIPTO@LN) packet data network (PDN) connection of the UE and identifying a local home network identifier (LHN-ID) for the UE, and determine whether to prompt a release of the SIPTO@LN PDN connection based on the LHN-ID.

In Example 58, the processor circuit of Example 57 may optionally determine not to prompt the release of the SIPTO@LN PDN connection in response to a determination, based on the LHN-ID, that a local home network of the UE does not change according to the TAU procedure.

In Example 59, the processor circuit of Example 57 may optionally determine to prompt the release of the SIPTO@LN PDN connection in response to a determination, based on the LHN-ID, that a local home network of the UE changes according to the TAU procedure.

In Example 60, the processor circuit of Example 59 may optionally determine whether the SIPTO@LN PDN connection is a sole PDN connection for the UE.

In Example 61, the processor circuit of Example 60 may optionally prompt the release of the SIPTO@LN PDN connection by commencing a PDN disconnection procedure based on a determination that the SIPTO@LN PDN connection is not the sole PDN connection for the UE.

In Example 62, the processor circuit of Example 61 may optionally commence the PDN disconnection procedure with a reactivation requested cause.

In Example 63, the processor circuit of Example 60 may optionally prompt the release of the SIPTO@LN PDN connection by commencing a detach procedure based on a determination that the SIPTO@LN PDN connection is the sole PDN connection for the UE.

In Example 64, the MME of any of Examples 57 to 63 may optionally comprise a new MME of the UE following the TAU procedure, and the processor circuit may optionally receive the context response message from an old MME of the UE.

Example 65 is the MME of any of Examples 57 to 64, comprising a radio frequency (RF) transceiver, and one or more RF antennas.

Example 66 is at least one non-transitory computer-readable storage medium comprising a set of wireless connection management instructions that, in response to being executed on a computing device, cause the computing device to receive, at a target mobility management entity (MME) for a handover of a user equipment (UE), a forward relocation request, determine that a local gateway (L-GW)-provided packet data network (PDN) connection for the UE is to be disconnected based on the forward relocation request, and select a process for disconnecting the L-GW-provided PDN connection based on a determination of whether the L-GW-provided PDN connection comprises a lone PDN connection for the UE.

In Example 67, the L-GW-provided PDN connection of Example 66 may optionally comprise a selected internet protocol traffic offload at local network (SIPTO@LN) PDN connection.

In Example 68, the at least one non-transitory computer-readable storage medium of any of Examples 66 to 67 may optionally comprise wireless connection management instructions that, in response to being executed on the computing device, cause the computing device to disconnect the L-GW-provided PDN connection following the handover of the UE, by initiating the selected process.

In Example 69, the at least one non-transitory computer-readable storage medium of any of Examples 66 to 68 may optionally comprise wireless connection management instructions that, in response to being executed on the computing device, cause the computing device to select an MME-initiated detach process in response to a determination that the L-GW-provided PDN connection comprises the lone PDN connection for the UE.

In Example 70, the at least one non-transitory computer-readable storage medium of any of Examples 66 to 68 may optionally comprise wireless connection management instructions that, in response to being executed on the computing device, cause the computing device to select an MME-requested PDN disconnection process in response to a determination that the L-GW-provided PDN connection does not comprise the lone PDN connection for the UE.

In Example 71, the at least one non-transitory computer-readable storage medium of Example 70 may optionally comprise wireless connection management instructions that, in response to being executed on the computing device, cause the computing device to initiate the MME-requested PDN disconnection process with a reactivation requested cause.

In Example 72, the at least one non-transitory computer-readable storage medium of any of Examples 66 to 71 may optionally comprise wireless connection management instructions that, in response to being executed on the computing device, cause the computing device to receive the forward relocation request from a source MME for the handover of the UE.

In Example 73, the at least one non-transitory computer-readable storage medium of any of Examples 66 to 72 may optionally comprise wireless connection management instructions that, in response to being executed on the computing device, cause the computing device to determine that the L-GW-provided PDN connection for the UE is to be disconnected based on the forward relocation request and on a determination that a local home network (LHN) of the UE does not change during the handover of the UE.

Example 74 is a wireless connection management method, comprising receiving a notification of a mobility procedure for a user equipment (UE), determining, by a processor circuit, whether to release a local gateway (L-GW)-provided packet data network (PDN) connection of the UE, and in response to a determination that the L-GW-provided PDN connection is to be released, sending either a detach request message or a delete session request message to initiate a process to release the L-GW-provided PDN connection.

In Example 75, the L-GW-provided PDN connection of Example 74 may optionally comprise a selected internet protocol traffic offload at local network (SIPTO@LN) PDN connection.

In Example 76, the wireless connection management method of any of Examples 74 to 75 may optionally comprise sending a detach request message to initiate a mobility management entity (MME)-initiated detach process to release the L-GW-provided PDN connection in response to a determination that the L-GW-provided PDN connection comprises an only PDN connection of the UE.

In Example 77, the wireless connection management method of any of Examples 74 to 75 may optionally comprise sending a delete session request message to initiate a mobility management entity (MME)-requested PDN disconnection process to release the L-GW-provided PDN connection in response to a determination that the L-GW-provided PDN connection does not comprise an only PDN connection of the UE.

In Example 78, the wireless connection management method of Example 77 may optionally comprise sending the delete session request message with a reactivation requested cause.

In Example 79, the wireless connection management method of any of Examples 74 to 78 may optionally comprise sending either the detach request message or the delete session request message following the mobility procedure.

In Example 80, the mobility procedure of any of Examples 74 to 79 may optionally comprise a tracking area update (TAU).

In Example 81, the mobility procedure of any of Examples 74 to 80 may optionally comprise a handover.

Example 82 is at least one non-transitory computer-readable storage medium comprising a set of instructions that, in response to being executed on a computing device, cause the computing device to perform a wireless connection management method according to any of Examples 74 to 81.

Example 83 is an apparatus, comprising means for performing a wireless connection management method according to any of Examples 74 to 81.

Example 84 is a system, comprising an apparatus according to Example 83, a radio frequency (RF) transceiver, and one or more RF antennas.

Example 85 is an evolved packet core (EPC) node, comprising logic, at least a portion of which is in hardware, the logic to receive, at a target mobility management entity (MME) for a handover of a user equipment (UE), a forward relocation request, determine that a local gateway (L-GW)-provided packet data network (PDN) connection for the UE is to be disconnected based on the forward relocation request, and select a process for disconnecting the L-GW-provided PDN connection based on a determination of whether the L-GW-provided PDN connection comprises a lone PDN connection for the UE.

In Example 86, the L-GW-provided PDN connection of Example 85 may optionally comprise a selected internet protocol traffic offload at local network (SIPTO@LN) PDN connection.

In Example 87, the logic of any of Examples 85 to 86 may optionally disconnect the L-GW-provided PDN connection following the handover of the UE, by initiating the selected process.

In Example 88, the logic of any of Examples 85 to 87 may optionally select an MME-initiated detach process in response to a determination that the L-GW-provided PDN connection comprises the lone PDN connection for the UE.

In Example 89, the logic of any of Examples 85 to 87 may optionally select an MME-requested PDN disconnection process in response to a determination that the L-GW-provided PDN connection does not comprise the lone PDN connection for the UE.

In Example 90, the logic of Example 89 may optionally initiate the MME-requested PDN disconnection process with a reactivation requested cause.

In Example 91, the logic of any of Examples 85 to 90 may optionally receive the forward relocation request from a source MME for the handover of the UE.

In Example 92, the logic of any of Examples 85 to 91 may optionally determine that the L-GW-provided PDN connection for the UE is to be disconnected based on the forward relocation request and on a determination that a local home network (LHN) of the UE does not change during the handover of the UE.

Example 93 is the EPC node of any of Examples 85 to 92, comprising a radio frequency (RF) transceiver, and one or more RF antennas.

Example 94 is at least one non-transitory computer-readable storage medium comprising a set of wireless connection management instructions that, in response to being executed on a mobility management entity (MME), cause the MME to receive a notification of a mobility procedure for a user equipment (UE), determine whether to release a local gateway (L-GW)-provided packet data network (PDN) connection of the UE, and in response to a determination that the L-GW-provided PDN connection is to be released, send either a detach request message or a delete session request message to initiate a process to release the L-GW-provided PDN connection.

In Example 95, the L-GW-provided PDN connection of Example 94 may optionally comprise a selected internet protocol traffic offload at local network (SIPTO@LN) PDN connection.

In Example 96, the at least one non-transitory computer-readable storage medium of any of Examples 94 to 95 may optionally comprise wireless connection management instructions that, in response to being executed on the MME, cause the MME to send a detach request message to initiate a mobility management entity (MME)-initiated detach process to release the L-GW-provided PDN connection in response to a determination that the L-GW-provided PDN connection comprises an only PDN connection of the UE.

In Example 97, the at least one non-transitory computer-readable storage medium of any of Examples 94 to 95 may optionally comprise wireless connection management instructions that, in response to being executed on the MME, cause the MME to send a delete session request message to initiate a mobility management entity (MME)-requested PDN disconnection process to release the L-GW-provided PDN connection in response to a determination that the L-GW-provided PDN connection does not comprise an only PDN connection of the UE.

In Example 98, the at least one non-transitory computer-readable storage medium of Example 97 may optionally comprise wireless connection management instructions that, in response to being executed on the MME, cause the MME to send the delete session request message with a reactivation requested cause.

In Example 99, the at least one non-transitory computer-readable storage medium of any of Examples 94 to 98 may optionally comprise wireless connection management instructions that, in response to being executed on the MME, cause the MME to send either the detach request message or the delete session request message following the mobility procedure.

In Example 100, the mobility procedure of any of Examples 94 to 99 may optionally comprise a tracking area update (TAU).

In Example 101, the mobility procedure of any of Examples 94 to 99 may optionally comprise a handover.

Example 102 is a wireless connection management method, comprising receiving, during a mobility procedure for a user equipment (UE), a mobility procedure control message, determining, by a processor circuit, to release a selected internet protocol traffic offload at local network (SIPTO@LN) packet data network (PDN) connection of the UE based on the mobility procedure control message, and following the mobility procedure, triggering a deactivation of the SIPTO@LN PDN connection.

In Example 103, the wireless connection management method of Example 102 may optionally comprise triggering the deactivation of the SIPTO@LN PDN connection by initiating an MME-requested PDN disconnection procedure in response to a determination that the SIPTO@LN PDN connection does not comprise an only PDN connection of the UE.

In Example 104, the wireless connection management method of Example 103 may optionally comprise initiating the MME-requested PDN disconnection procedure with a reactivation requested cause.

In Example 105, the wireless connection management method of Example 102 may optionally comprise triggering the deactivation of the SIPTO@LN PDN connection by initiating an MME-initiated detach procedure in response to a determination that the SIPTO@LN PDN connection comprises an only PDN connection of the UE.

In Example 106, the mobility procedure of any of Examples 102 to 105 may optionally comprise a tracking area update (TAU) procedure, and the mobility procedure control message may optionally comprise a context response message.

In Example 107, the mobility procedure of any of Examples 102 to 105 may optionally comprise a handover procedure, and the mobility procedure control message may optionally comprise a forward relocation request message.

In Example 108, the wireless connection management method of any of Examples 102 to 107 may optionally comprise receiving the mobility procedure control message from a previous serving MME of the UE.

In Example 109, the wireless connection management method of any of Examples 102 to 108 may optionally comprise receiving the mobility procedure control message over an S10 interface connection.

Example 110 is at least one non-transitory computer-readable storage medium comprising a set of instructions that, in response to being executed on a computing device, cause the computing device to perform a wireless connection management method according to any of Examples 102 to 109.

Example 111 is an apparatus, comprising means for performing a wireless connection management method according to any of Examples 102 to 109.

Example 112 is a system, comprising an apparatus according to Example 111, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobility management entity (MME), comprising:
a memory; and
logic, at least a portion of which is implemented in circuitry coupled to the memory, the logic to receive a forward relocation request during a handover procedure for a user equipment (UE), determine, based on the forward relocation request, whether a local home network of the UE changes, determine whether to maintain a selected internet protocol traffic offload at local network (SIPTO@LN) packet data network (PDN) connection of the UE following the handover procedure based on whether the local home network of the UE changes, and maintain the SIPTO@LN PDN connection in response to a determination that the local home network of the UE does not change.

2. The MME of claim 1, the logic to determine whether the local home network of the UE changes according to the handover procedure based on a local home network identifier (ID) comprised in the forward relocation request.

3. The MME of claim 1, the logic to initiate a procedure to release the SIPTO@LN PDN connection in response to a determination that the local home network of the UE changes, the logic to select the procedure based on a determination of whether the SIPTO@LN PDN connection comprises an only PDN connection of the UE.

4. The MME of claim 3, the logic to initiate an MME-requested PDN disconnection procedure to release the SIPTO@LN PDN connection in response to a determination that the SIPTO@LN PDN connection does not comprise the only PDN connection of the UE.

5. The MME of claim 4, the logic to send a delete session request to initiate the MME-requested PDN disconnection procedure.

6. The MME of claim 5, the logic to send the delete session request with a reactivation requested cause.

7. The MME of claim 3, the logic to initiate an MME-initiated detach procedure to release the SIPTO@LN PDN connection in response to a determination that the SIPTO@LN PDN connection comprises the only PDN connection of the UE.

8. A mobility management entity (MME), comprising:
a memory; and
logic, at least a portion of which is implemented in circuitry coupled to the memory, the logic to:
determine whether to release a selected internet protocol traffic offload at local network (SIPTO@LN) packet data network (PDN) connection of a user equipment (UE) following a tracking area update (TAU) procedure for the UE based on a local home network identifier (ID) comprised in a received context response message, the SIPTO@LN PDN connection to comprise a connection to a packet data network through a stand-alone gateway (GW); and
in response to a determination to release the SIPTO@LN PDN connection:
determine whether SIPTO@LN PDN connection comprises an only PDN connection of the UE; and
initiate an MME-initiated detach procedure to release the SIPTO@LN connection in response to a determination that the SIPTO@LN PDN connection comprises the only PDN connection of the UE.

9. The MME of claim 8, the logic to determine, based on the local home network ID, whether a local home network of the UE changes, and determine whether to release the SIPTO@LN PDN connection based on whether the local home network of the UE changes.

10. The MME of claim 9, the logic to determine not to release the SIPTO@LN PDN connection in response to a determination that the local home network of the UE does not change.

11. The MME of claim 9, the logic to determine to release the SIPTO@LN PDN connection in response to a determination that the local home network of the UE changes.

12. The MME of claim 8, the logic to send a detach request to initiate the MME-initiated detach procedure.

13. At least one non-transitory computer-readable storage medium comprising a set of instructions that, in response to being executed at a mobility management entity (MME), cause the MME to:
receive a forward relocation request message during a handover of a user equipment (UE);
determine whether to release a selected internet protocol traffic offload at local network (SIPTO@LN) packet data network (PDN) connection of the UE following the handover based on the forward relocation request message, the SIPTO@LN PDN connection to comprise a connection with a packet data network through a stand-alone gateway (GW); and
in response to a determination to release the SIPTO@LN PDN connection, select a procedure for releasing the SIPTO@LN PDN connection based on whether the SIPTO@LN PDN connection comprises an only PDN connection of the UE.

14. The at least one non-transitory computer-readable storage medium of claim 13, comprising instructions that, in response to being executed at the MME, cause the MME to:
determine whether a local home network of the UE changes as a result of the handover based on the forward relocation request message; and determine whether to release the SIPTO@LN PDN connection following the handover based on whether the local home network of the UE changes as a result of the handover.

15. The at least one non-transitory computer-readable storage medium of claim 14, comprising instructions that, in response to being executed at the MME, cause the MME to determine whether the local home network of the UE changes as a result of the handover based on a local home network identifier (ID) comprised in the forward relocation request message.

16. The at least one non-transitory computer-readable storage medium of claim 14, comprising instructions that, in response to being executed at the MME, cause the MME to determine to maintain the SIPTO@LN PDN connection following the handover in response to a determination that the local home network of the UE does not change as a result of the handover.

17. The at least one non-transitory computer-readable storage medium of claim 14, comprising instructions that, in response to being executed at the MME, cause the MME to determine to release the SIPTO@LN PDN connection following the handover in response to a determination that the local home network of the UE changes as a result of the handover.

18. At least one non-transitory computer-readable storage medium comprising a set of instructions that, in response to being executed at a mobility management entity (MME), cause the MME to:
    determine whether to release a selected internet protocol traffic offload at local network (SIPTO@LN) packet data network (PDN) connection of a user equipment (UE) following a tracking area update (TAU) procedure for the UE based on whether a local home network of the UE changes, the SIPTO@LN PDN connection to comprise a connection to a packet data network through a stand-alone gateway (GW); and
    in response to a determination to release the SIPTO@LN PDN connection:
        determine whether the SIPTO@LN PDN connection comprises an only PDN connection of the UE; and
        initiate an MME-requested PDN disconnection procedure to release the SIPTO@LN connection in response to a determination that the SIPTO@LN PDN connection does not comprise the only PDN connection of the UE.

19. The at least one non-transitory computer-readable storage medium of claim 18, comprising instructions that, in response to being executed at the MME, cause the MME to determine whether the local home network of the UE changes based on a local home network identifier (ID) comprised in a received context response message.

20. The at least one non-transitory computer-readable storage medium of claim 18, comprising instructions that, in response to being executed at the MME, cause the MME to determine to release the SIPTO@LN PDN connection in response to a determination that the local home network of the UE changes.

21. The at least one non-transitory computer-readable storage medium of claim 18, comprising instructions that, in response to being executed at the MME, cause the MME to send a delete session request to initiate the MME-requested PDN disconnection procedure.

22. The at least one non-transitory computer-readable storage medium of claim 21, comprising instructions that, in response to being executed at the MME, cause the MME to send the delete session request with a reactivation requested cause.

* * * * *